(12) United States Patent
Lee et al.

(10) Patent No.: US 8,685,572 B2
(45) Date of Patent: Apr. 1, 2014

(54) ORGANIC ELECTROLYTE AND LITHIUM BATTERY INCLUDING THE SAME

(75) Inventors: Dong-joon Lee, Seoul (KR);
Young-gyoon Ryu, Suwon-si (KR);
Seok-soo Lee, Yongin-si (KR);
Dong-min Im, Seoul (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 549 days.

(21) Appl. No.: 12/929,588

(22) Filed: Feb. 2, 2011

(65) Prior Publication Data
US 2011/0195305 A1    Aug. 11, 2011

(30) Foreign Application Priority Data
Feb. 9, 2010  (KR) .................. 10-2010-0012025

(51) Int. Cl.
*H01M 6/18*    (2006.01)

(52) U.S. Cl.
USPC ........... 429/307; 429/200; 429/199; 429/188; 429/329; 429/327; 429/322; 252/62.2

(58) Field of Classification Search
USPC ......... 429/307, 200, 199, 188, 329, 327, 322; 252/62.2
See application file for complete search history.

(56) References Cited

FOREIGN PATENT DOCUMENTS

CA        1115658      *   1/1982

* cited by examiner

*Primary Examiner* — Laura Weiner
(74) *Attorney, Agent, or Firm* — Lee & Morse, P.C.

(57) ABSTRACT

An organic electrolyte including a lithium salt; an organic solvent; and a flavone-based or flavanon-based compound, and a lithium battery including the organic electrolyte.

14 Claims, 3 Drawing Sheets

ORGANIC ELECTROLYTE AND LITHIUM BATTERY INCLUDING THE SAME

CROSS-REFERENCE TO RELATED APPLICATION

This application claims the benefit of Korean Patent Application No. 10-2010-0012025, filed Feb. 9, 2010 in the Korean Intellectual Property Office, the disclosure of which is incorporated herein, by reference.

BACKGROUND

1. Field

The present disclosure relates to an organic electrolyte and a lithium battery including the organic electrolyte.

2. Description of the Related Art

As portable electronic devices, such as video cameras, mobile phones, portable media players (PMPs), and electronic books, are being made light weight and highly functionalized, batteries used as power supply sources for driving the portable electronic devices should have a high capacity and a high energy density. Specifically, rechargeable lithium batteries have about three times the energy density per unit weight, as compared to existing lead storage batteries, nickel-cadmium batteries, nickel hydrogen batteries, and nickel zinc batteries, and are quickly charged. Thus, lithium batteries are being actively developed.

A typical lithium battery may include lithium cobalt oxide ($LiCoO_2$) as a positive electrode material, a graphite material as a negative electrode material, a porous film separator, and an electrolyte including a Li salt in a mixed solvent. The mixed solvent can include a high dielectric organic solvent and a low dielectric organic solvent, or a high dielectric organic solvent and a low viscosity organic solvent.

In order to have a high capacity and energy density, active materials of a negative electrode and positive electrode may be prepared to have a high capacity, and/or a charging voltage of a battery may be set high, so as to obtain more capacity from active materials.

SUMMARY

According to various embodiments, provided are organic electrolytes for improving cycle characteristics and high temperature characteristics of lithium batteries, by suppressing a decomposition reaction of a solvent, at a high voltage.

According to various embodiments, provided is a lithium battery including the organic electrolyte.

According to an aspect of the present invention, an organic electrolyte includes: a lithium salt; an organic solvent; and a compound represented by Formula 1 below:

Formula 1 wherein, $R_1$ through $R_{12}$ are independently selected from the group consisting of a hydrogen atom, a nitro group, an amino group, a hydroxyl group, a halogen atom, a cyano group, a carboxylic group, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ alkoxy group, a substituted or unsubstituted $C_2$-$C_{20}$ alkoxycarbonyl group, a substituted or unsubstituted $C_6$-$C_{30}$ aryl group, a substituted or unsubstituted $C_1$-$C_{20}$ heteroalkyl group, a substituted or unsubstituted $C_3$-$C_{20}$ heteroaryl group, a substituted or unsubstituted $C_2$-$C_{20}$ alkylcarbonyl group, a substituted or unsubstituted $C_7$-$C_{30}$ arylcarbonyl group, and a substituted or unsubstituted $C_4$-$C_{30}$ heteroarylcarbonyl group. $R_{11}$ and $R_{12}$ may be bonded.

According to another aspect of the present invention, a lithium battery includes: a positive electrode; a negative electrode; and the organic electrolyte.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects of the invention will become apparent and more readily appreciated from the following description of the exemplary embodiments, taken in conjunction with the accompanying drawings, of which.

DETAILED DESCRIPTION

Reference will now be made in detail to the exemplary embodiments of the present disclosure, examples of which are illustrated in the accompanying drawings, wherein like reference numerals refer to the like elements throughout. The exemplary embodiments are described below, in order to explain the aspects of the present disclosure, by referring to the figures.

An organic electrolyte, according to an exemplary embodiment of the present invention, includes a lithium salt, an organic solvent, and a compound represented by Formula 1 below.

Formula 1

Here, $R_1$ through $R_{12}$ may be each independently selected from the group consisting of a hydrogen atom, a nitro group, an amino group, a hydroxyl group, a halogen atom, a cyano group, a carboxylic group, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ alkoxy group, a substituted or unsubstituted $C_2$-$C_{20}$ alkoxycarbonyl group, a substituted or unsubstituted $C_6$-$C_{30}$ aryl group, a substituted or unsubstituted $C_1$-$C_{20}$ heteroalkyl group, a substituted or unsubstituted $C_3$-$C_{20}$ heteroaryl group, a substituted or unsubstituted $C_2$-$C_{20}$ alkylcarbonyl group, a substituted or unsubstituted $C_7$-$C_{30}$ arylcarbonyl group, and a substituted or unsubstituted $C_4$-$C_{30}$ heteroarylcarbonyl group. $R_{11}$ and $R_{12}$ may form a bond.

The compound of Formula 1 stably scavenges a radical formed under a high voltage and/or high temperature, thereby improving cycle characteristics of a battery including the same.

Generally, when a charging voltage is set to be about 4.3 V or above, in order to obtain more capacity from an active material, an electrolyte is decomposed. Thus, cycle characteristics deteriorate, due to the depletion of the electrolyte. Specifically, the electrolyte is oxidized when a high voltage is applied to a positive electrode, thereby forming a radical. Such a radical is unstable. Thus, the radical is decomposed and generates carbon dioxide, or reacts with another element of the electrolyte, thereby deteriorating the electrolyte. The unstable radical also deteriorates the stability of a battery. Accordingly, in order to suppress deterioration of the cycle characteristics, due to the depletion of the electrolyte, the self-decomposition of the unstable radical may be prevented, and/or the radical may be prevented from reacting with other elements of the electrolyte.

The compound of Formula 1 may operate as a radical scavenger, so as to form a more stable electrolyte. Accordingly, the self-decomposition of the radical is prevented, and also, the reaction thereof with other electrolyte elements may be suppressed. As a result, electric characteristics, for example, cycle characteristics and capacity retention characteristics, of the organic electrolyte are improved, under a high voltage and a high temperature, and the generation of carbon dioxide is reduced. Accordingly, the stability of the organic electrolyte may be improved.

Examples of the compound of Formula 1 include compounds represented by Formulas 2 and 3 below.

Formula 2

Here, $R_{13}$ through $R_{22}$ may be each independently selected from the group consisting of a hydrogen atom, a nitro group, an amino group, a hydroxyl group, a halogen atom, a cyano group, a carboxylic group, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ alkoxy group, a substituted or unsubstituted $C_2$-$C_{20}$ alkoxycarbonyl group, a substituted or unsubstituted $C_6$-$C_{30}$ aryl group, a substituted or unsubstituted $C_1$-$C_{20}$ heteroalkyl group, a substituted or unsubstituted $C_3$-$C_{20}$ heteroaryl group, a substituted or unsubstituted $C_2$-$C_{20}$ alkylcarbonyl group, a substituted or unsubstituted $C_7$-$C_{30}$ arylcarbonyl group, and a substituted or unsubstituted $C_4$-$C_{30}$ heteroarylcarbonyl group.

Formula 3

Here, $R_{23}$ through $R_{34}$ may be each independently selected from the group consisting of a hydrogen atom, a nitro group, an amino group, a hydroxyl group, a halogen atom, a cyano group, a carboxylic group, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ alkoxy group, a substituted or unsubstituted $C_2$-$C_{20}$ alkoxycarbonyl group, a substituted or unsubstituted $C_6$-$C_{30}$ aryl group, a substituted or unsubstituted $C_1$-$C_{20}$ heteroalkyl group, a substituted or unsubstituted $C_3$-$C_{20}$ heteroaryl group, a substituted or unsubstituted $C_2$-$C_{20}$ alkylcarbonyl group, a substituted or unsubstituted $C_7$-$C_{30}$ arylcarbonyl group, and a substituted or unsubstituted $C_4$-$C_{30}$ heteroarylcarbonyl group.

An example of the compound of Formula 2 includes flavone represented by Formula 4 below, and an example of the compound of Formula 3 includes flavanone represented by Formula 5 below:

Formula 4

Formula 5

Each substituent used in the above compounds may be defined as follows. "Alkyl" refers to a straight or branched, saturated monovalent hydrocarbon group having 1 to 20 carbon atoms, for example, 1 to 10 carbon atoms or 1 to 6 carbon atoms. An alkyl group may be arbitrarily substituted by at least one halogen substituent. Examples of the alkyl group may include methyl, ethyl, propyl, 2-propyl, n-butyl, isobutyl, tert-butyl, pentyl, hexyl, dodecyl, fluoromethyl, difluoromethyl, trifluoromethyl, chloromethyl, dichloromethyl, trichloromethyl, iodomethyl, bromomethyl, etc.

"Aryl" refers to a monovalent monocyclic, bicyclic, or tricyclic aromatic hydrocarbon group having 6 to 30 carbon atoms, for example, 6 to 18 carbon atoms, and may be arbitrarily substituted by at least one halogen substituent.

"Alkenyl" refers to a straight or branched, unsaturated hydrocarbon chain radical having 2 to 20 carbon atoms, for example, 2 to 10 carbon atoms or 2 to 6 carbon atoms, wherein the straight or branched hydrocarbon chain radical consists of carbon and hydrogen atoms and has at least one double bond. The "alkenyl" is bonded to a remaining bonding part of the molecule, according to a single bond or a double bond. Examples of the alkenyl group include ethyl, prop-1-enyl, but-1-enyl, pent-1-enyl, penta-1,4-dienyl, etc.

"Alkynyl" refers to a straight or branched, unsaturated hydrocarbon chain radical having 2 to 20 carbon atoms, for example, 2 to 10 carbon atoms or 2 to 6 carbon atoms, wherein the straight or branched hydrocarbon chain radical consists of carbon and hydrogen atoms and has at least one triple bond. The alkynyl group is bonded to the remaining bonding part of the molecule, according to a single bond or a triple bond. Examples of the alkynyl group include ethinyl, prop-1-ynyl, but-1-ynyl, pent-1-ynyl, pent-3-enyl, etc.

"Alkoxy" refers to an alkyl group, in which the alkyl group defined above is bonded to oxygen, to have a form of alkyl-O—.

"Heteroalkyl" refers to an alkyl group in which at least one carbon atom in the backbone of the alkyl group defined above is substituted by at least one heteroatom, for example, nitrogen, sulfur, oxygen, or phosphorous.

"Heteroaryl" refers to an aryl group in which at least one carbon atom in the ring of the aryl group defined above is substituted by at least one heteroatom, for example, nitrogen, sulfur, oxygen, or phosphorous.

"Alkylene", "alkenylene", and "alkynylene" respectively refer to the alkyl group, the alkenyl group, and the alkynyl group, respectively, having a divalent structure.

In the organic electrolyte, according to an exemplary embodiment of the present invention, an amount of the compound of Formula 1 may be from about 0.01 to about 10 parts by weight, based on 100 parts by weight of the organic solvent. For example, the amount of the compound may be from about 0.01 to about 3 parts by weight. This range is suitable for achieving the desired properties of the organic electrolyte.

The organic solvent of the organic electrolyte may be a nonaqueous organic solvent, which is a migration medium of ions involved in electrochemical reactions of a lithium battery.

Examples of the nonaqueous organic solvent may include carbonates, esters, ethers, alcohols, and non-protonic solvents. Examples of the carbonates available as the nonaqueous organic solvent may include dimethyl carbonate (DMC), diethyl carbonate (DEC), ethyl methyl carbonate (EMC), dipropyl carbonate (DPC), methylpropyl carbonate (MPC), ethylpropyl carbonate (EPC), methyl ethyl carbonate (MEC), ethylene carbonate (EC), propylene carbonate (PC), and butylene carbonate (BC). Examples of the esters available as the nonaqueous organic solvent may include methyl acetate, ethyl acetate, n-propyl acetate, dimethyl acetate, methyl propionate, ethyl propionate, γ-butyrolactone, decanolide, valerolactone, mevalonolactone, and caprolactone. Examples of the ethers available as the nonaqueous organic solvent may include dibutyl ether, tetraglyme, diglyme, dimethoxyethane, 2-methyltetrahydrofuran, and tetrahydrofuran. An example of a ketone available as the nonaqueous organic solvent may be cyclohexanone. Examples of the alcohols available as the nonaqueous organic solvent may include ethyl alcohol, isopropyl alcohol, and the like. Examples of the non-protonic solvents may include nitrils, such as R—CN (wherein R is a straight, branched or cyclic $C_2$-$C_{20}$ hydrocarbon group, which may have a double-bonded aromatic ring or an ether bond); amides, such as dimethylformamide; dioxolanes, such as 1,3-dioxolane; and sulfolanes.

One of the nonaqueous organic solvents may be used. Alternatively, at least two of the nonaqueous organic solvents may be used in combination. In this case, a mixing ratio of the nonaqueous organic solvents may appropriately vary, according to the performance of the battery, which would be obvious to one of ordinary skill in the art.

The lithium salt used in the organic electrolyte is dissolved in the organic solvent and is a source of lithium ions, enabling the basic operation of a lithium battery. In addition, the lithium salt facilitates the migration of lithium ions between a positive electrode and a negative electrode. Examples of the lithium salt may include at least one supporting electrolyte salt selected from the group consisting of $LiPF_6$, $LiBF_4$, $LiSbF_6$, $LiAsF_6$, $LiN(SO_2C_2F_6)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$(LiBOB; lithium bis(oxalato) borate). The concentration of the lithium salt may be in a range of about 0.1 to about 2.0 M. When the concentration of the lithium salt is within this range, the electrolyte may have an appropriate conductivity and viscosity and thus, may exhibit excellent performance, by allowing lithium ions to effectively migrate.

A lithium battery, according to an exemplary embodiment of the present invention, may include a positive electrode, a negative electrode, and the organic electrolyte. The type of the lithium battery is not limited, and may be, for example, a lithium secondary battery, such as a lithium ion battery, a lithium ion polymer battery, a lithium sulfur battery, or the like, or a lithium primary battery.

The positive electrode includes a current collector and a positive electrode active material layer disposed on the current collector. In order to form the positive electrode, a positive electrode active material, a conducting agent, a binder, and a solvent may be mixed, to prepare a positive electrode active material composition. A positive electrode plate may be manufactured by directly coating the positive electrode active material composition on an aluminum current collector, then drying the resultant to form a positive electrode active material layer. Alternatively, the positive electrode plate may be manufactured by casting the positive electrode active material composition on a separate support, and laminating a positive electrode active material film exfoliated from the support on an aluminum current collector, to form the positive electrode active material layer. The method of manufacturing the positive electrode would be obvious to one of ordinary skill in the art. Thus, a detailed description thereof will not be provided. The solvent may be N-methylpyrrolidone, acetone, water, or the like, but is not limited thereto.

A compound (lithiated intercalation compound) that allows reversible intercalation of lithium may be used as the positive electrode active material. In particular, the positive electrode active material may be at least one composite oxide of lithium and a metal selected from the group consisting of cobalt, manganese, nickel, and a combination thereof. Examples of the positive electrode active material may include compounds represented by the following formulae:

$Li_aA_{1-b}X_bD_2$ (where $0.95 \le a \le 1.1$, and $0 \le b \le 0.5$); $Li_aE_{1-b}X_bO_{2-c}D_c$ (where $0.95 \le a \le 1.1$, $0 \le b \le 0.5$, and $0 \le c \le 0.05$); $LiE_{2-b}X_bO_{4-c}D_c$ (where $0 \le b \le 0.5$ and $0 \le c \le 0.05$); $Li_aNi_{1-b-c}$ $Co_bB_cD_\alpha$ (where $0.95 \le a \le 1.1$, $0 \le b \le 0.5$, $0 \le c \le 0.05$, and $0 < \alpha \le 2$); $Li_aNi_{1-b-c}Co_bX_cO_{2-\alpha}M_\alpha$ (where $0.95 \le a \le 1.1$, $0 \le b \le 0.5$, $0 \le c \le 0.05$, and $0 < \alpha < 2$); $Li_aNi_{1-b-c}Co_bX_cO_{2-\alpha}M_2$ (where $0.95 \le a \le 1.1$, $0 \le b \le 0.5$, $0 \le c \le 0.05$, and $0 < \alpha < 2$); $Li_aNi_{1-b-c}Mn_bX_cD_\alpha$ (where $0.95 \le a \le 1.1$, $0 \le b \le 0.5$, $0 \le c \le 0.05$, and $0 < \alpha \le 2$); $Li_aNi_{1-b-c}Mn_bX_cO_{2-\alpha}M_\alpha$ (where $0.95 \le a \le 1.1$, $0 \le b \le 0.5$, $0 \le c \le 0.05$, and $0 < \alpha < 2$); $Li_aNi_{1-b-c}Mn_bX_cO_{2-\alpha}M_2$ (where $0.95 \le a \le 1.1$, $0 \le b \le 0.5$, $0 \le c \le 0.05$, and $0 < \alpha < 2$); $Li_aNi_bE_cG_dO_2$ (where $0.90 \le a \le 1.1$, $0 \le b \le 0.9$, $0 \le c \le 0.5$, and $0.001 \le d \le 0.1$); $Li_aNi_bCo_cMn_dG_eO_2$ (where $0.90 \le a \le 1.1$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1.1$ and $0.001 \le b \le 0.1$); $Li_aCoG_bO_2$ (where $0.90 \le a \le 1.1$ and $0.001 \le b \le 0.1$); $Li_aMnG_bO_2$ (where $0.90 \le a \le 1.1$ and $0.001 \le b \le 0.1$); $Li_aMn_2G_bO_4$ (where $0.90 \le a \le 1.1$ and $0.001 \le b \le 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); and $LiFePO_4$.

In the formulae above, A is selected from the group consisting of nickel (Ni), cobalt (Co), manganese (Mn), and combinations thereof; X is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; M is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; Z is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Co), and combinations thereof.

The compounds listed above as positive electrode active materials may have a surface coating layer (hereinafter, "coating layer"). Alternatively, a mixture of a compound without a coating layer and a compound having a coating layer, the compounds being selected from the compounds listed above, may be used. The coating layer may include at least one element selected from the group consisting of oxides, hydroxides, oxyhydroxides, oxycarbonates, and hydroxycarbonates of the coating element. The compounds for the coating layer may be amorphous or crystalline. The coating element contained in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof.

The coating layer may be formed using any method, for example, a spray coating method, a dipping method, or the like, which does not adversely affect the physical properties of the positive electrode active material. This would be obvious to one of ordinary skill in the art. Thus, a detailed description thereof will not be provided.

The binder contained in the positive electrode active material layer strongly binds the positive electrode active material particles together and to the current collector. Examples of the binder include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, and a polymer having ethylene oxide, polyvinylpyrrolidone, polyurethane, polytetrafluoroethylene, polyvinylidene fluoride, polyethylene, polypropylene, styrene-butadiene rubber (SBR), acrylated SBR, an epoxy resin, and nylon.

The conducting agent included in the positive electrode active material layer improves the conductivity of the positive electrode. Any conductive material causing no chemical change in batteries may be used. Examples of the conducting agent include, but are not limited to, carbonaceous materials, such as natural graphite, artificial graphite, carbon black, acetylene black, ketchen black, and carbon fibers; metal-based materials, such as copper, nickel, aluminum, and silver, in powder or fiber form; and conducting materials, including conducting polymers, such as a polyphenylene derivative, and a mixture thereof. The current collector may be aluminum (Al), but is not limited thereto.

Similarly to the manufacturing of the positive electrode plate described above, a negative electrode active material, a conducting agent, a binder, and a solvent may be mixed to prepare a negative electrode active material composition. The negative electrode active material composition is directly coated on a copper current collector, to prepare a negative electrode plate. Alternatively, the negative electrode material composition may be cast on a separate support, and then a negative electrode active material film delaminated from the support may be laminated on the copper current collector, to prepare a negative electrode plate. The amounts of the negative electrode active material, the conducting agent, the binder, and the solvent are the same as those commonly used in a lithium battery.

A silicon/carbon complex, a silicon oxide ($SiO_x$), silicon metal, a silicon thin film, lithium metal, a lithium alloy, a carbonaceous material, or graphite may be used as the negative electrode active material. The conducting agent, the binder and the solvent in the negative electrode active material composition are the same as those in the positive electrode active material composition. If desired, a plasticizer may be further added to the positive electrode active material composition and the negative electrode active material composition, to form pores in electrode plates.

A separator may be disposed between the positive electrode and the negative electrode, according to the type of the lithium battery. Any separator that is commonly used for lithium batteries may be used. In an exemplary embodiment, the separator may have low resistance to migration of ions in an electrolyte and may have a high electrolyte-retaining ability. Examples of the separator may include glass fiber, polyester, Teflon, polyethylene, polypropylene, polytetrafluoroethylene (PTFE), and a combination thereof, each of which may be a nonwoven fabric or a woven fabric. In particular, a windable separator including polyethylene, polypropylene or the like may be used for a lithium ion battery. A separator capable of retaining a large amount of an organic electrolyte may be used for a lithium-ion polymer battery. Such a separator may be manufactured as follows.

A polymer resin, a filler, and a solvent are mixed to prepare a separator composition. Then, the separator composition may be directly coated on an electrode and then dried, to form a separator film. Alternatively, the separator composition may be cast on a separate support and then dried to form a separator composition film. The separator composition film is separated from the support and then laminated on an electrode, to form a separator film.

The polymer resin is not specifically limited, and may be any material that is commonly used as a binder for an electrode plate. Examples of the polymer resin include a vinylidenefluoride/hexafluoropropylene copolymer, polyvinylidenefluoride, polyacrylonitrile, polymethylmethacrylate, and mixtures thereof. For example, a vinylidenefluoride/hexafluoropropylene copolymer, having about 8 to about 25 wt % of hexafluoropropylene, may be used.

The separator may be interposed between the positive electrode plate and the negative electrode plate, to form an electrode. The electrode assembly is wound or folded and then sealed in a cylindrical or rectangular battery case. Then, the organic electrolyte is injected into the battery case, to complete the manufacture of a lithium ion battery. Alternatively, a plurality of electrode assemblies may be stacked in a bi-cell structure and impregnated with the organic electrolyte. The resultant is put into a pouch and sealed, thereby completing the manufacture of a lithium ion polymer battery.

Figure 1:
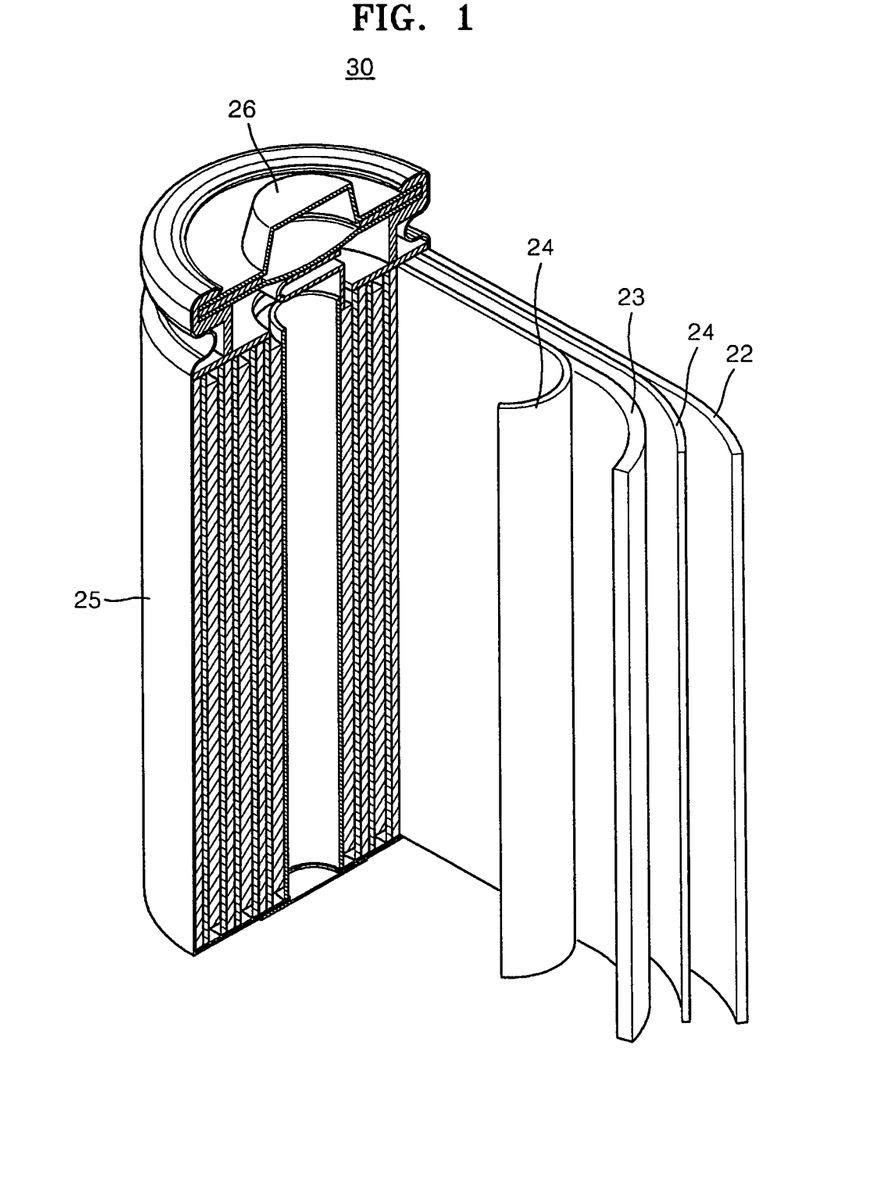
FIG. 1 is a schematic perspective view of a typical structure of a lithium battery, according to an exemplary embodiment of the present invention.

FIG. 1 is a schematic view of a typical structure of a lithium battery 30, according to an exemplary embodiment of the present invention. Referring to FIG. 1, the lithium battery 30 includes an electrode assembly including a positive electrode 23, a negative electrode 22, a separator 24 interposed between the positive electrode 23 and the negative electrode 22. The electrode assembly is disposed in a battery case 25, which is filled with an electrolyte (not shown), and sealed with a sealing member 26. The electrode assembly is manufactured by sequentially stacking the positive electrode 23, the negative electrode 22 and the senator 24 upon one another, winding the stack in a spiral form.

Hereinafter, one or more exemplary embodiments of the present invention will be described in more detail, with reference to the following examples. However, these examples are not intended to limit the scope of the present invention.

Preparation of Electrolyte

Example 1

An organic electrolyte was prepared by adding 0.5 parts by weight of a flavone represented by Formula 4 below, to 100 parts by weight of a mixed organic solvent including 30 volume % of ethylenecarbonate, 50 volume % of diethylcarbonate, and 20 volume % of ethylmethylcarbonate, and using 1.3M $LiPF_6$ as a lithium salt.

Formula 4

Example 2

An organic electrolyte was prepared by adding 0.5 parts by weight of a flavanone represented by Formula 5 below, to 100 parts by weight of a mixed organic solvent including 30 volume % of ethylenecarbonate, 50 volume % of diethylcarbonate, and 20 volume % of ethylmethylcarbonate, and using 1.3M $LiPF_6$ as a lithium salt.

Formula 5

Example 3

An organic electrolyte was prepared by adding 2 parts by weight of a flavone of Formula 4, to 100 parts by weight of a mixed organic solvent including 30 volume % of ethylenecarbonate, 50 volume % of diethylcarbonate, and 20 volume % of ethylmethylcarbonate, and using 1.3M $LiPF_6$ as a lithium salt.

Example 4

An organic electrolyte was prepared by adding 2 parts by weight of a flavanone of Formula 5, to 100 parts by weight of a mixed organic solvent including 30 volume % of ethylenecarbonate, 50 volume % of diethylcarbonate, and 20 volume % of ethylmethylcarbonate, and using 1.3M $LiPF_6$ as a lithium salt.

Comparative Example 1

An organic electrolyte was prepared by using 100 parts by weight of a mixed organic solvent including 10 volume % of ethylenecarbonate, 20 volume % of fluoroethylenecarbonate, 50 volume % of diethylcarbonate, and 20 volume % of ethylmethylcarbonate, and using 1.3M $LiPF_6$ as a lithium salt. The fluoroethylenecarbonate was added to form a thin film.

Manufacture of Lithium Battery

Example 5

A 2032 coin cell was prepared by using a silicon oxide ($SiO_x$) electrode as a negative electrode, a $LiCoO_2$ electrode as a positive electrode, a Celgard separator, and the organic electrolyte obtained in Example 1.

A positive electrode material was prepared as a slurry, by adding and thoroughly mixing $LiCoO_2$ powder, a binder, in which 5 wt % of polyvinylidenefluoride (PVdF) is dissolved in N-methylpyrrolidone (NMP), and a conducting agent (super P), in a weight ratio of 94:3:3, in an agate mortar.

The slurry was casted on an aluminum foil having a thickness of 15 μm, at an interval of 100 μm, using a doctor blade, to obtain a positive electrode plate. The positive electrode plate was put into an oven and dried first at 90° C. for about 2 hours, so that the NMP was evaporated, and then was put into a vacuum oven and dried again at 120° C. for about 2 hours, so that the NMP was completely evaporated. Then, the positive electrode plate was rolled to obtain a positive electrode having a thickness of 60 μm.

A negative electrode material was prepared as a slurry, by adding and thoroughly mixing silicon oxide (SiO) powder and a binder, in which polyamideimide is dissolved in a weight ratio of 90:10, in a mortar. The slurry was casted on a copper foil having a thickness of 10 μm, at an interval of 60 μm, using a doctor blade, to obtain a negative electrode plate. The negative electrode plate was put into an oven and dried at 90° C. for 2 hours, and then rolled to have a thickness of 47 μm. The negative electrode plate was cured in a vacuum oven at 200° C. for 1 hour, to obtain a negative electrode.

Example 6

A coin cell was manufactured in the same manner as in Example 5, except that the organic electrolyte prepared in Example 2 was used, instead of the organic electrolyte prepared in Example 1.

Example 7

A coin cell was manufactured in the same manner as in Example 5, except that the organic electrolyte prepared in Example 3 was used, instead of the organic electrolyte prepared in Example 1.

Example 8

A coin cell was manufactured in the same manner as in Example 5, except that the organic electrolyte prepared in Example 4 was used, instead of the organic electrolyte prepared in Example 1.

Comparative Example 2

A coin cell was manufactured in the same manner as in Example 5, except that the organic electrolyte prepared in Comparative Example 1 was used, instead of the organic electrolyte prepared in Example 1.

Evaluation Example 1

Testing of Cycle Characteristics of Battery

A following charging and discharging tests were performed on the coin cells prepared according to Examples 5 through 8, and Comparative Example 2, at 60° C.

Each coin cell was charged to 4.35 V at 0.05 C, and then discharged to 2.5 V at 0.05 C, in a $1^{st}$ cycle. In a $2^{nd}$ cycle, each coin cell was charged to 4.35 V at 0.1 C, maintained at 4.35 V until a current reached 0.05 C, and then discharged to 2.5 V at 0.1 C. In a $3^{rd}$ cycle, each coin cell was charged to 4.35 V at 0.5 C, maintained at 4.35 V until a current reached 0.05 C, and then discharged to 2.5 V at 0.1 C. From $4^{th}$ to $84^{th}$ cycles, each coin cell was charged under the same conditions as above at 1 C, and discharged to 2.5 V at 0.8 C. Cycles from the $4^{th}$ cycle are referred to as a cycling mode, and the $4^{th}$ cycle is referred to as a $1^{st}$ cycle in the cycling mode. Results of the charging and discharging up to the $84^{th}$ cycle are shown in Table 1 and FIGS. 2 and 3. A capacity retention rate at the $84^{th}$ cycle at 60° C. is defined by Equation 1 below.

Figure 2:
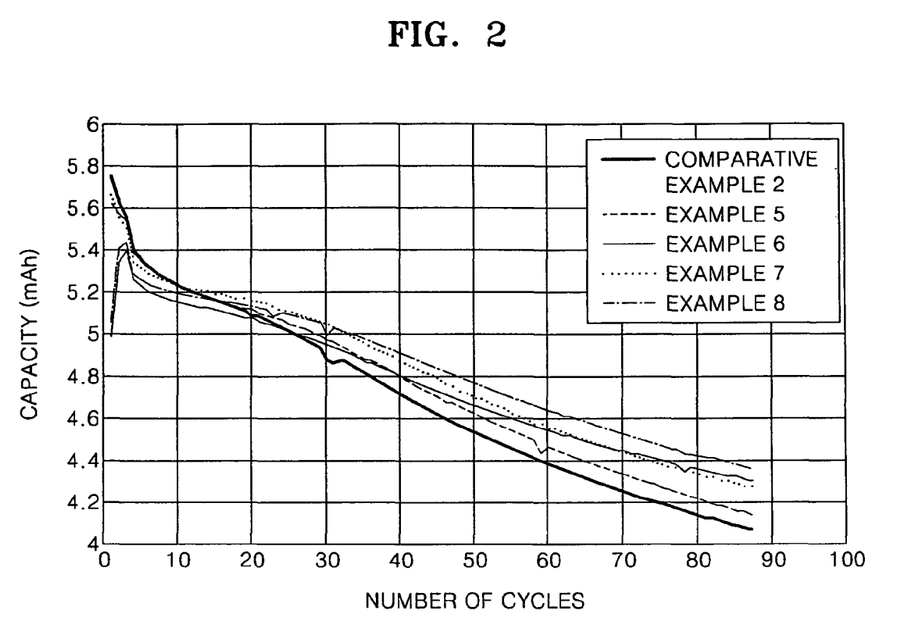
FIG. 2 is a graph showing cycle characteristics of lithium batteries prepared according to Examples 5 through 8 and Comparative Example 2.
Figure 3:
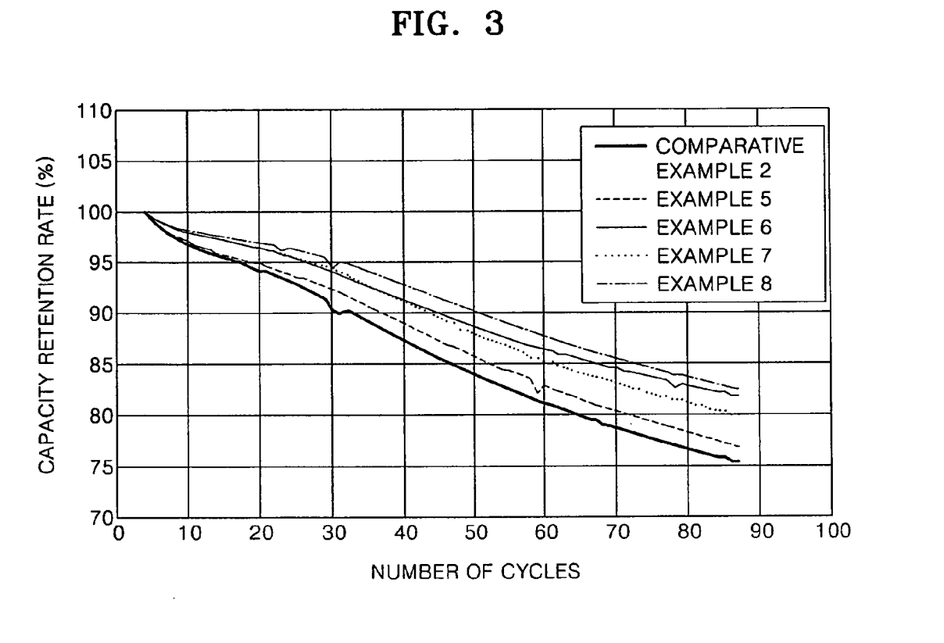
FIG. 3 is a graph of showing capacity retention rates of the lithium batteries prepared according to Examples 5 through 8 and Comparative Example 2.

Capacity retention rate at $84^{th}$ cycle (at 60° C.) [%]=$84^{th}$-cycle discharge capacity at 60° C./$1^{st}$-cycle discharge capacity at 60° C.  Equation 1

TABLE 1

| | $84^{th}$-Cycle Capacity Retention Rate at 60° C. [%] |
|---|---|
| Comparative Example 2 | 75.3 |
| Example 5 | 76.8 |
| Example 6 | 79.9 |
| Example 7 | 81.8 |
| Example 8 | 82.3 |

As shown in Table 1 and FIGS. 2 and 3, the coin cells of Examples 5 through 8, wherein the compound of Formula 4 or 5 was used as a radical scavenger, had higher capacity retention rates during a high temperature charging and discharging test, as compared to the coin cell of Comparative Example 2, wherein a positive electrode thin film is formed.

As described above, according to the one or more of the above exemplary embodiments of the present invention, since the organic electrolyte including the compound of Formula 1 improves cycle characteristics and high temperature characteristics of a lithium battery, by suppressing a continuous decomposition reaction of a solvent under a high voltage, when the organic electrolyte is used in a lithium battery, the lithium battery may have improved electrical characteristics.

It should be understood that the exemplary embodiments described therein should be considered in a descriptive sense only and not for purposes of limitation. Descriptions of features or aspects within each embodiment should typically be considered as available for other similar features or aspects in other embodiments.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

What is claimed is:

1. An organic electrolyte comprising:
   a lithium salt;
   an organic solvent; and
   a compound represented by Formula 1 below:

Formula 1 wherein, $R_1$ through $R_{12}$ are independently selected from the group consisting of a hydrogen atom, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ alkoxy group, and
$R_{11}$ and $R_{12}$ are bondable to each other.

2. The organic electrolyte of claim 1, wherein the compound of Formula 1 is a compound represented by Formula 2 or Formula 3 below:

Formula 2 wherein $R_{13}$ through $R_{22}$ are independently selected from the group consisting of a hydrogen atom, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ alkoxy group; and

Formula 3 wherein $R_{23}$ through $R_{34}$ are independently selected from the group consisting of a hydrogen atom, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, and a substituted or unsubstituted $C_1$-$C_{20}$ alkoxy group.

3. The organic electrolyte of claim 2, wherein the compound of Formula 2 is a compound represented by Formula 4 below:

Formula 4

4. The organic electrolyte of claim 2, wherein the compound of Formula 3 is a compound represented by Formula 5 below:

Formula 5

5. The organic electrolyte of claim 1, wherein the amount of the compound of Formula 1 is from about 0.01 to about 10 parts by weight based on 100 parts by weight of the organic solvent.

6. The organic electrolyte of claim 1, wherein the compound of Formula 1 reacts with a radical formed according to an oxidation reaction of the organic solvent.

7. The organic electrolyte of claim 1, wherein each of $R_1$ through $R_{12}$ are hydrogen atoms.

8. A lithium battery comprising:
a positive electrode:
a negative electrode; and
the organic electrolyte of claim 1.

9. A lithium battery comprising:
a positive electrode:
a negative electrode; and
the organic electrolyte of claim 2.

10. A lithium battery comprising:
a positive electrode:
a negative electrode; and
the organic electrolyte of claim 3.

11. A lithium battery comprising:
a positive electrode:
a negative electrode; and
the organic electrolyte of claim 4.

12. A lithium battery comprising:
a positive electrode:
a negative electrode; and
the organic electrolyte of claim 5.

13. A lithium battery comprising:
a positive electrode:
a negative electrode; and
the organic electrolyte of claim 6.

14. A lithium battery comprising:
a positive electrode:
a negative electrode; and
the organic electrolyte of claim 7.

* * * * *